United States Patent
Xu et al.

(10) Patent No.: US 11,505,735 B2
(45) Date of Patent: Nov. 22, 2022

(54) FRICTION REDUCING ADDITIVES INCLUDING NANOPARTICLES

(71) Applicant: Halliburton Energy Services, Inc., Houston, TX (US)

(72) Inventors: Liang X. Xu, The Woodlands, TX (US); James W. Ogle, Livingston, TX (US)

(73) Assignee: Halliburton Energy Services. Inc., Houston, TX (US)

( * ) Notice: Subject to any disclaimer, the term of this patent is extended or adjusted under 35 U.S.C. 154(b) by 0 days.

(21) Appl. No.: 17/275,929

(22) PCT Filed: Oct. 19, 2018

(86) PCT No.: PCT/US2018/056691
§ 371 (c)(1),
(2) Date: Mar. 12, 2021

(87) PCT Pub. No.: WO2020/081095
PCT Pub. Date: Apr. 23, 2020

(65) Prior Publication Data
US 2021/0261855 A1  Aug. 26, 2021

(51) Int. Cl.
*C09K 8/68* (2006.01)
*C09K 8/60* (2006.01)
*C09K 8/66* (2006.01)
*B82Y 30/00* (2011.01)
*B82Y 40/00* (2011.01)

(52) U.S. Cl.
CPC ............... *C09K 8/68* (2013.01); *C09K 8/602* (2013.01); *C09K 8/665* (2013.01); *B82Y 30/00* (2013.01); *B82Y 40/00* (2013.01); *C09K 2208/10* (2013.01); *C09K 2208/28* (2013.01)

(58) Field of Classification Search
CPC ..................................... E21B 43/267
See application file for complete search history.

(56) References Cited

U.S. PATENT DOCUMENTS 7,237,610 B1 * 7/2007 Saini .................. C09K 8/64
166/279
9,701,883 B2   7/2017 Kumar et al.
(Continued)

FOREIGN PATENT DOCUMENTS

WO    2017/052522 A1    3/2017

OTHER PUBLICATIONS

International Search Report and Written Opinion issued in related PCT Application No. PCT/US2018/056691 dated Jul. 19, 2019, 14 pages.

*Primary Examiner* — William D Hutton, Jr.
*Assistant Examiner* — Avi T Skaist
(74) *Attorney, Agent, or Firm* — Conley Rose, P.C.; Rodney B. Carroll

(57) ABSTRACT

Compositions and methods for use in fracturing treatments using friction reducing additives that include nanoparticles are provided. In some embodiments, the methods include: providing a treatment fluid that includes an aqueous base fluid and a friction reducing additive, the friction reducing additive including at least one polymer and a plurality of nanoparticles; and introducing the treatment fluid into a portion of a subterranean formation at or above a pressure sufficient to create or enhance at least one fracture in the subterranean formation.

18 Claims, 2 Drawing Sheets

(56) References Cited

U.S. PATENT DOCUMENTS

| | | | |
|---|---|---|---|
| 2003/0125215 A1* | 7/2003 | Schwartz | B08B 9/0555 |
| | | | 507/121 |
| 2007/0207933 A1 | 9/2007 | McMechan et al. | |
| 2009/0298721 A1 | 12/2009 | Robb et al. | |
| 2011/0312857 A1 | 12/2011 | Amanullah et al. | |
| 2013/0105154 A1* | 5/2013 | Vorderbruggen | C09K 8/805 |
| | | | 427/407.1 |
| 2015/0075798 A1 | 3/2015 | Tang et al. | |
| 2015/0148269 A1 | 5/2015 | Tamsilian et al. | |
| 2016/0304647 A1 | 10/2016 | Shaban et al. | |
| 2017/0037302 A1 | 2/2017 | Liang et al. | |
| 2017/0327722 A1 | 11/2017 | Li et al. | |

* cited by examiner

US 11,505,735 B2

FRICTION REDUCING ADDITIVES INCLUDING NANOPARTICLES

CROSS-REFERENCE TO RELATED APPLICATION

The present application is a U.S. National Stage Application of International Application No. PCT/US2018/056691 filed Oct. 19, 2018, which is incorporated herein by reference in its entirety for all purposes.

BACKGROUND

The present disclosure relates to compositions and methods for treating subterranean formations.

Wells in hydrocarbon-bearing subterranean formations may be stimulated to produce those hydrocarbons using hydraulic fracturing treatments. In hydraulic fracturing treatments, a viscous fluid (e.g., fracturing fluid or pad fluid) is pumped into a subterranean formation at a sufficiently high rate and/or pressure (e.g., above the fracture gradient of the formation) such that one or more fractures are created or enhanced in the formation. These fractures provide conductive channels through which fluids in the formation such as oil and gas may flow to a well bore for production. In order to maintain sufficient conductivity through the fracture, it is often desirable that the formation surfaces within the fracture or "fracture faces" be able to resist erosion and/or migration to prevent the fracture from narrowing or fully closing. Typically, proppant particulates suspended in a portion of the fracturing fluid are also deposited in the fractures when the fracturing fluid is converted to a thin fluid to be returned to the surface. These proppant particulates serve to prevent the fractures from fully closing so that conductive channels are formed through which produced hydrocarbons can flow.

In some conventional fracturing treatments, large amounts of water or other fluids (e.g., an average of 1 million gallons per fracturing stage) are pumped at high rates and pressures in order provide sufficient energy downhole to form fractures in the formation of the desired geometries. To create fractures in certain types of formations (e.g., unconventional formations or low permeability formations) or to create complex fracture network in subterranean formations, operators may rely on the use of a low viscosity fluid (e.g., slickwater fluids) as the main fracturing fluid and small size proppant (e.g., 100-mesh) as the proppant. During the placement of aqueous fracturing fluids into a wellbore, a considerable amount of energy may be lost due to friction between the treatment fluid in turbulent flow and the formation and/or tubular goods (e.g., pipes, coiled tubing, etc.) disposed within the well bore. As a result of these energy losses, additional horsepower may be necessary to achieve the desired treatment. To reduce these energy losses, friction reducing polymers are typically included in aqueous treatment fluids.

BRIEF DESCRIPTION OF THE DRAWINGS

These drawings illustrate certain aspects of some of the embodiments of the present disclosure, and should not be used to limit or define the claims.

Figure 1:
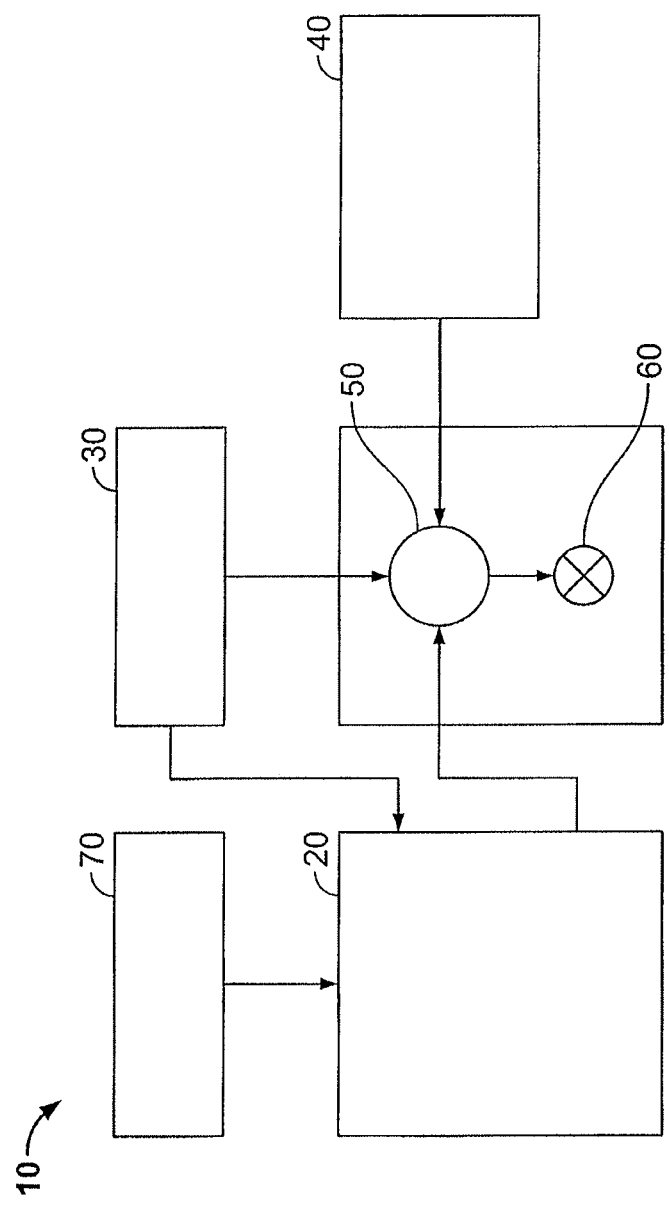
FIG. 1 is a diagram illustrating an example of a fracturing system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to compositions and methods for treating subterranean formations. More particularly, the present disclosure relates to compositions and methods for use in fracturing treatments using friction reducing additives that include nanoparticles.

The present disclosure provides friction reducing additives that include at least one polymer and a plurality of nanoparticles, and associated methods of use in subterranean fracturing treatments. The methods of the present disclosure generally include: providing a treatment fluid that includes an aqueous base fluid and a friction reducing additive, the friction reducing additive including at least one polymer and a plurality of nanoparticles; and introducing the treatment fluid into a portion of a subterranean formation at or above a pressure sufficient to create or enhance at least one fracture in the subterranean formation. While not limiting the present disclosure or claims to any particular mechanism of action, In some embodiments, the nanoparticles may interact or associate with molecules of the polymer (e.g., via hydrogen bonding, hydrophobic association, covalent bonding, ionic associations, etc.) to enhance the degree to which the polymer is able to reduce friction as the treatment fluid is pumped, flowed, or otherwise introduced into a subterranean formation.

Among the many potential advantages to the methods and compositions of the present disclosure, only some of which are alluded to herein, the methods and compositions of the present disclosure may exhibit enhanced viscosity in treatment fluids used in fracturing, particularly as compared with certain conventional friction reducing systems and additives. In some embodiments, the friction reducing additives of the present disclosure may viscosity a treatment fluid to a desired degree using less polymeric additives than would be necessary for certain convention friction reducing polymers to provide the same increase of viscosity. This may, among other benefits, result in less plugging, rock wettability alteration, and/or damage in the formation, as well as more effective stimulation of the formation. In some embodiments, the treatment fluids and/or friction reducing additives of the present disclosure may not require the presence of crosslinkers to achieve the desired levels of viscosity and/or friction reduction. In some embodiments, the friction reducing additives of the present disclosure may be effective in brines, brackish water, and/or produced water despite the presence of ionic species or large amounts of dissolved solids (e.g., high total dissolved solids (TDS) fluids) therein.

The polymers in the friction reducing additives of the present disclosure may include any cationic, anionic, non-ionic, and/or amphoteric polymer, or any combination thereof. As used herein, unless the context otherwise requires, a "polymer" includes homopolymers, copolymers, terpolymers, etc. In addition, the term "copolymer" as used herein is not limited to the combination of polymers having two monomeric units, but includes any combination of monomeric units, for example, terpolymers, tetrapolymers, etc. The polymers are generally water-based linear polymers that are not crosslinked by a crosslinking agent. Examples of polymers that may be suitable include, but are not limited to, polyacrylamide, polyacrylamide derivatives, polyacrylamide co-polymers, polyethylene oxide, polypropylene oxide, a copolymer of polyethylene and polypropylene oxide, polysaccharides (e.g., guar, guar derivatives, cellulose, cellulose derivatives (e.g., hydroxyethylcellulose)), biopolymers, and any combination thereof. In some embodiments, a polymer including acrylamide may be a cationic, anionic, non-ionic, and/or amphoteric polymer, or any combination thereof. In some embodiments, a polymer including acrylamide may be a partially hydrolyzed acrylamide. As used in this disclosure, "partially hydrolyzed acrylamide" refers to acrylamide wherein in the range of from about 3% to about 70% of the amide groups have been hydrolyzed to carboxyl groups. Polyacrylamide copolymers generally include polymers of acrylamide with one or more additional monomers. Examples of such additional monomers may include, but are not limited to acrylic acid, acrylic acid ester, methacrylic acid, methacrylic acid ester, acrylates, 2-acrylamido-2-methylpropane sulfonic acid, 2-acrylamido-tertbutylsulfonic acid, N,N-dimethylacrylamide, vinyl sulfonic acid, N-vinyl acetamide, N-vinyl formamide, itaconic acid, methacrylic acid, diallyl dimethyl ammonium chloride, and any combination thereof.

In some embodiments, the polymers may include certain multifunctional polymer additives that having releasable choline groups or releasable poly(diallyldimethylammonium chloride) (polyDADMAC) groups in the polymer backbone. In some embodiments, such polymers may include one or more cationic block copolymers of diallyldimethylammonium chloride (DADMAC) or at least one monomer selected from: a (trimethylamino)ethyl acrylate and/or a (trimethylamino)ethyl methacrylate or any salts thereof (e.g., (trimethylamino)ethyl acrylate methyl chloride quaternary salt, (trimethylamino)ethyl acrylate methyl sulfate quaternary salt, (trimethylamino)ethyl acrylate benzyl chloride quaternary salt, (trimethylamino)ethyl acrylate sulfuric acid salt, (trimethylamino)ethyl acrylate hydrochloric acid salt, (triethylamino)ethyl acrylate methyl chloride quaternary salt, (trimethylamino)ethyl methacrylate methyl chloride quaternary salt, (trimethylamino) ethyl methacrylate methyl sulfate quaternary salt, (trimethylamino)ethyl methacrylate benzyl chloride quaternary salt, (trimethylamino)ethyl methacrylate sulfuric acid salt, (trimethylamino) ethyl methacrylate hydrochloric acid salt, (trimethylamino) ethyl methacryloyl hydrochloric acid salt), or a combination thereof. In some embodiments, such polymers may include a poly(acrylamide-co-dimethylaminoethyl acrylate) quaternary ammonium chloride salt.

Those of ordinary skill in the art will appreciate that the polymer(s) included in the treatment fluid should have a molecular weight sufficient to provide a desired level of friction reduction. In general, polymers having higher molecular weights may be needed to provide a desirable level of friction reduction. In certain embodiments, the polymer has a molecular weight in the range of about 5,000 Daltons ("Da") to about 999,000,000 Da. In other embodiments, the polymer has a molecular weight in the range of about 1,000,000 Da to about 50,000,000 Da. In other embodiments, the polymer has a molecular weight in the range of about 3,000,000 Da to about 10,000,000 Da. Those of ordinary skill in the art will recognize that friction-reducing polymers having molecular weights outside the listed range may still provide some degree of friction reduction.

The polymers may be present in a treatment fluid in an amount sufficient to provide a desirable level of friction reduction. In certain embodiments, the polymer is present in a treatment fluid in an amount sufficient to maintain laminar flow when the treatment fluid is pumped into the well bore and/or subterranean formation. For example, in some embodiments, the polymer may be present in the treatment fluid in an amount of from about 0.1 to about 100 gallon per thousand gallons of fluid ("gpt"). In some embodiments, the polymer may be present in the treatment fluid in an amount of from about 0.1 to about 5 gpt, or in other embodiments, from about 0.500 to about 2 gpt. In some embodiments, the polymer may be present in the treatment fluid in an amount of less than about 3 gpt, or alternatively, less than about 2 gpt. In certain embodiments, an amount of polymer on the higher end of the above ranges may be desired, among other reasons, to impart adequate viscosity to the fluid. In certain embodiments, the treatment fluids of the present disclosure may have a total polymer concentration of less than 3 gpt, or alternatively, less than about 2 gpt.

The nanoparticles in the friction reducing additives of the present disclosure may include any solid particles having one or more dimensions of about 1000 nm or less, or alternatively, about 100 nm or less, or alternatively, about 50 nm or less. In some embodiments, the nanoparticles for use in conjunction with the present disclosure may have a size with at least one dimension ranging from a lower limit of about 0.5 nm, 1 nm, 2 nm, 5 nm, 10 nm, or 25 nm to an upper limit of about 500 nm, 400 nm, 250 nm, or 100 nm and wherein the size in at least one dimension may range from any lower limit to any upper limit and encompass any subset therebetween. The nanoparticles may be hydrophobic or hydrophilic, and may be made of any known material, including but not limited to silica, graphene, metals (e.g., aluminum, iron, titanium, zinc), alkaline earth metals, metal oxides, boron, laponite, hydroxides, polymers, carbon, clay, composite materials, and any combination or mixture thereof. In some embodiments, the nanoparticles may include nanotubes, such as clay nanotubes (e.g., halloysite), carbon nanotubes, or the like. In some embodiments, the surface of the nanoparticles may be chemically modified or functionalized (e.g., have another compounded grafted onto its surface), and/or the hydrophobicity or hydrophilicity of the nanoparticle may be modified by another chemical agent. For example, a silica nanoparticle (which typically would be hydrophilic) may be modified with a chemical agent such as a siloxane, a silane, or a fluorocarbon to make the surface of the nanoparticle hydrophobic. In other embodiments, the nanoparticles may be unmodified and/or unfunctionalized. The nanoparticles may be provided in any suitable form, e.g., as dry solids or may be provided in a liquid suspension or slurry with a carrier fluid.

The nanoparticles may be present in a treatment fluid in an amount sufficient to provide a desirable level of viscosity in conjunction with the polymer discussed above. The nanoparticles may be present in a higher or lower concentration than, or the same concentration as, the polymer discussed above. In some embodiments, the nanoparticles may be present in the treatment fluid in amount of from about 0.01% to about 5% by volume of the treatment fluid. In some embodiments, the nanoparticles may be present in the treatment fluid in amount of from about 0.1% to about 3% by volume of the treatment fluid, or in other embodiments, from about 0.5% to about 2% by volume of the treatment fluid. In some embodiments, the nanoparticles may be present in the treatment fluid in amount of about 1% by volume of the treatment fluid.

The treatment fluids used in the methods and compositions of the present disclosure may include any aqueous base fluid known in the art and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may include water from any source. Such aqueous fluids may include fresh water, salt water (e.g., water containing one or more salts dissolved therein), brine (e.g., saturated salt water), brackish water, seawater, produced water (e.g., water produced from the same formation where the method of the present disclosure is being conducted), or any combination thereof. In most embodiments of the present disclosure, the aqueous fluids include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of polymers, nanoparticles, and/or other additives included in the fluid. One of ordinary skill in the art, with the benefit of this disclosure, will recognize when such density and/or pH adjustments are appropriate. In certain embodiments, the treatment fluids may include a mixture of one or more base fluids and/or gases, including but not limited to emulsions, foams, and the like.

In some embodiments, the friction reducing additives and/or treatment fluids of the present disclosure optionally may include at least one surfactant, which may act as a compatibility agent and/or dispersion aid, e.g., to facilitate mixing and/or dispersing the nanoparticles throughout the fluid. The surfactants may include any known surfactant, and may be cationic, anionic, nonionic, or amphoteric. Types of cationic surfactants that may be suitable for certain embodiments include, but are not limited to, alkyl amines, alkyl amine salts, quaternary ammonium salts such as trimethyltallowammonium chloride, amine oxides, alkyltrimethyl amines, triethyl amines, alkyldimethylbenzylamines, alkylamidobetaines such as cocoamidopropyl betaine, alpha-olefin sulfonate, C8 to C22 alkylethoxylate sulfate, trimethylcocoammonium chloride, derivatives thereof, and combinations thereof. Types of anionic surfactants that may be suitable for certain embodiments of the present disclosure include, but are not limited to, alkyl carboxylates, alkylether carboxylates, N-acylaminoacids, N-acylglutamates, N-acylpolypeptides, alkylbenzenesulfonates, paraffinic sulfonates, α-olefinsulfonates, lignosulfates, derivatives of sulfosuccinates, polynapthylmethylsulfonates, alkyl sulfates, alkylethersulfates, monoalkylphosphates, polyalkylphosphates, fatty acids, alkali salts of acids, alkali salts of fatty acids, alkaline salts of acids, sodium salts of acids, sodium salts of fatty acid, alkyl ethoxylate, soaps, derivatives thereof, and combinations thereof. Types of non-ionic surfactants that may be suitable for certain embodiments of the present disclosure include, but are not limited to, alcohol oxylalkylates, alkyl phenol oxylalkylates, nonionic esters such as sorbitan esters alkoxylates of sorbitan esters, castor oil alkoxylates, fatty acid alkoxylates, lauryl alcohol alkoxylates, nonylphenol alkoxylates, octylphenol alkoxylates, and tridecyl alcohol alkoxylates. The selection of a suitable surfactant may depend on several factors that would be recognized by a person of skill in the art with the benefit of this disclosure, including but not limited to the type of polymer in the friction reducing additive, the characteristics of the base fluid (e.g., pH, salinity, etc.), and the like. In some embodiments, certain surfactants may exhibit certain synergistic effects with the polymer in the friction reducing additive, which may enhance the degree to which the polymer is able to reduce friction and/or increase viscosity. In certain embodiments, some such surfactants may enhance the viscosity of the treatment fluid. When used, the surfactant may be mixed with the other components of the friction reducing additive before it is mixed into the treatment fluid. Alternatively, the surfactant may be added to the treatment fluid separately from (before, after, or concurrently with) either or both of the polymer and/or nanoparticles. In other embodiments, the treatment fluids of the present disclosure may be substantially or entirely free of surfactants.

In certain embodiments, the friction reducing additives and/or treatment fluids used in the methods and systems of the present disclosure optionally may include any number of additional additives. Examples of such additional additives include, but are not limited to, salts, surfactants, acids, proppant particulates (including microproppants), diverting agents, fluid loss control additives, gas, nitrogen, carbon dioxide, surface modifying agents, tackifying agents, foamers, corrosion inhibitors, scale inhibitors, catalysts, clay control agents, biocides, additional friction reducers, antifoam agents, bridging agents, flocculants, additional $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), and the like. A person skilled in the art, with the benefit of this disclosure, will recognize the types of additives that may be included, or should not be included, in the fluids of the present disclosure for a particular application. For example, in some embodiments, the fluids of the present disclosure may be substantially or entirely free of crosslinking agents, viscoelastic surfactants, and/or any of the other optional additives listed above.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the polymers, nanoparticles, and/or other components of the treatment fluid may be metered directly into a base treatment fluid to form a treatment fluid. In certain embodiments, the base fluid may be mixed with the polymers, nanoparticles, and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure. In some embodiments, the various components of the friction reducing additives and/or treatment fluids of the present disclosure may be mixed into the treatment fluid during some stages but not others. For example, the friction reducing additive including the polymer and nanoparticles may be continuously mixed into the treatment fluid, while the optional surfactant is only added in selected stages, among other reasons, to enhance the viscosity and/or other properties of the fluid only during those stages. In other embodiments, the friction reducing polymer (e.g., a single part friction reducer) may be continuously mixed into the treatment fluid, while the nanoparticles (and, optionally, the surfactant) is only added (e.g., to form a two-part friction reducing system) in selected stages, among other reasons, to enhance the viscosity and/or other properties of the fluid only during those stages.

The components of the friction reducing additive may be provided in any suitable fashion. In some embodiments, the polymer and nanoparticles may be provided together (either by themselves or with other optional components such as solvents and/or carrier fluids) and then mixed with the base fluid (and optionally other components) substantially simultaneously to form a treatment fluid of the present disclosure. In other embodiments, the polymer and the nanoparticles of the friction reducing additive may be mixed into the base fluid separately (either substantially simultaneously or at different times), which would be understood to form a friction reducing additive of the present disclosure. When added separately, the relative amounts and/or ratios of the polymer and the nanoparticles added to the treatment fluid may be varied throughout a particular fracturing operation. The polymer, nanoparticles, and/or surfactant also may be mixed into the treatment fluid in any order and at any place in the mixing or fracturing equipment used in a particular application of the present disclosure. For example, in some embodiments, the nanoparticles can be mixed into the fluid at the same injection point as the polymer (e.g., eye of the discharge pump on a fracturing blender), or may be added to the fluid upstream or downstream of that injection point.

The present disclosure in some embodiments provides methods for using the treatment fluids to carry out hydraulic fracturing treatments (including fracture acidizing treatments). In certain embodiments, a treatment fluid may be introduced into a subterranean formation. In some embodiments, the treatment fluid may be introduced into a well bore that penetrates a subterranean formation. In some embodiments, the treatment fluid may be introduced at a pressure sufficient to create or enhance one or more fractures within the subterranean formation. The treatment fluids used in these fracturing treatments may include a number of different types of fluids, including but not limited to pre-pad fluids, pad fluids, fracturing fluids, slickwater fluids, proppant-laden fluids, and the like. In some embodiments, the treatment fluids of the present disclosure may have a viscosity of about 50 cP or less, or alternatively, about 25 cP or less, or alternatively, about 15 cP or less. In some embodiments, the treatment fluids of the present disclosure may have a viscosity of from about 4 cP to about 15 cP at a shear rate of 511 s$^{-1}$. In other embodiments, the treatment fluids of the present disclosure may have higher viscosities, e.g., up to about 1000 cP.

In certain embodiments, the viscosity of the treatment fluids of the present disclosure may be significantly reduced (e.g., to a level of about 1.5 cP or less) after a certain period of time, among other reasons, to facilitate pumping and/or flowback of the fluids after use. In some embodiments, the viscosity of the treatment fluids may be reduced by the addition or activation of a breaker additive (e.g., an acid or other chemical agent that may degrade the polymer), or when subjected to certain amounts of shear, heat, or other conditions. In some embodiments, the viscosity of the treatment fluid may decrease after the passage of sufficient time (e.g., within 24 hours, within 4 hours at temperatures of 140° F., or within about 0.5 hours at temperatures of 140° F.) without the addition of any breaker additives thereto or change of conditions.

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, an optional proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may include water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., the polymers, nanoparticles, and/or surfactants of the present disclosure, as well as other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including optionally proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 2:
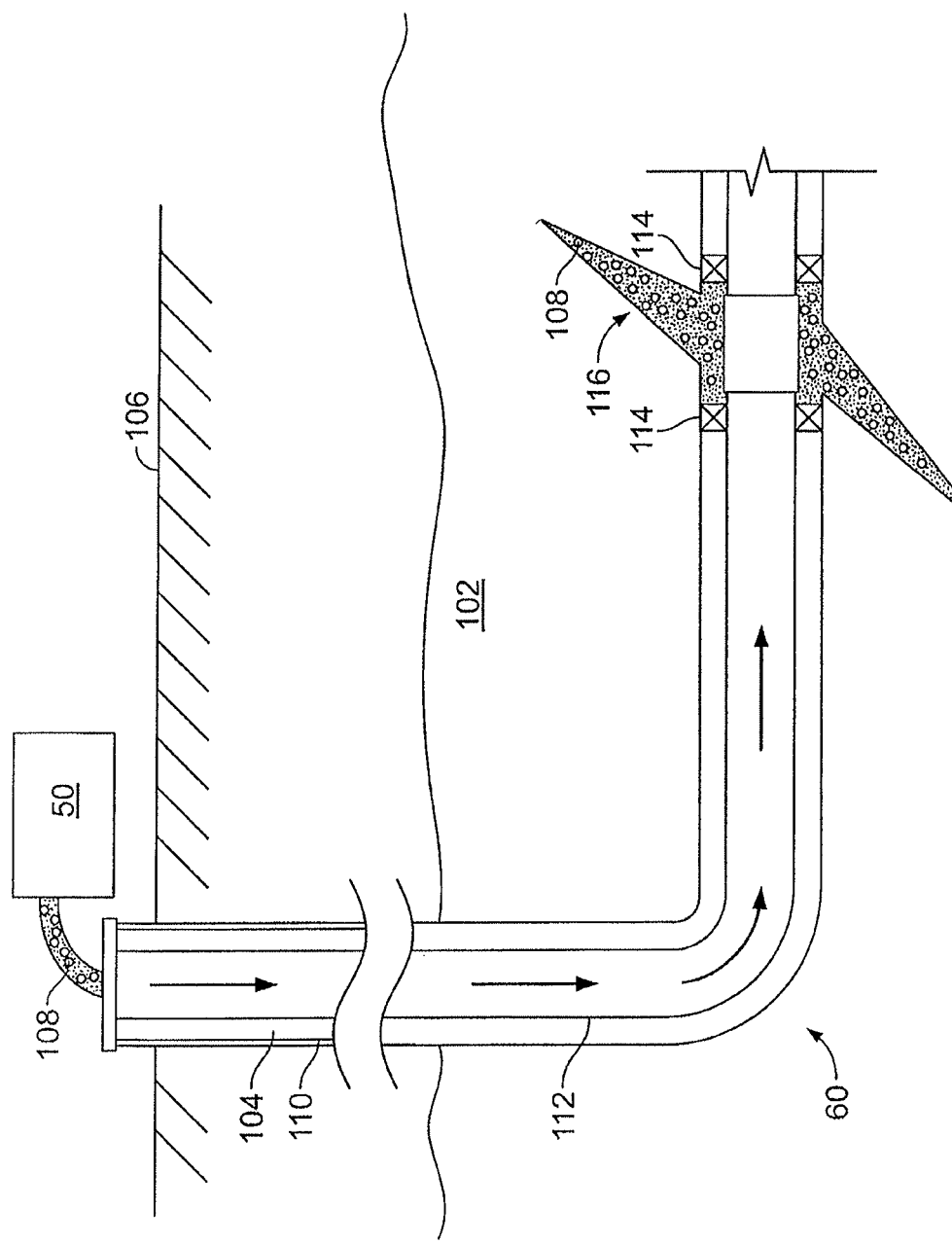
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to isolate an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. Optionally, the proppant particulates in the fracturing fluid 108 may enter the fractures 116 where they may remain after the fracturing fluid flows out of the well bore. These proppant particulates may "prop" fractures 116 such that fluids may flow more freely through the fractures 116. In some embodiments, multiple intervals in the same well bore/formation may be isolated and treated successively in similar manner.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

To facilitate a better understanding of the present disclosure, the following examples of certain aspects of certain embodiments are given. The following examples are not the only examples that could be given according to the present disclosure and are not intended to limit the scope of the disclosure or claims.

EXAMPLES

Example 1

Four fluid samples were each prepared by mixing 1 gpt of certain polymers with water at ambient temperature. Samples 1 and 3 (comparative) contained no additional additives. Samples 2 and 4 additionally contained 0.1% v/v of clay nanotubes (provided as a dry solid) and 1 gpt of an anionic/nonionic/amphoteric surfactant. The viscosity of each fluid was measured at ambient temperature using a Fann® 35 viscometer at a shear rate of 511 s$^{-1}$. The water source, polymer, and viscosity of each fluid sample are reported in Table 1 below.

TABLE 1

| Fluid Sample | Water | Polymer | Viscosity (cP) |
|---|---|---|---|
| 1 | Houston tap | Anionic acrylamide/acrylic acid copolymer | 4 |
| 2 | Houston tap | Anionic acrylamide/acrylic acid copolymer | 10 |
| 3 | Produced water | Cationic multifunctional polyacrylamide | 2 |
| 4 | Produced water | Cationic multifunctional polyacrylamide | 10 |

This example demonstrates that the additives of the present disclosure may impart enhanced viscosity to treatment fluids as compared with certain other known friction reducing additives.

Example 2

Another fluid sample of the present disclosure (Sample 5) was prepared by mixing a much larger amount (3 gpt) of the anionic acrylamide/acrylic acid copolymer from Samples 1 and 2 in Houston tap water along with 0.5% v/v of Cloisite® 20A, a source of organophilic phyllosilicate clay nanoparticles available from BYK USA, Inc. The viscosity of the fluid sample was measured ambient temperature using a Fann® 35 viscometer at a shear rate of 511 s$^{-1}$ at several intervals over a period of 15 minutes. Those measurements are reported in Table 2 below.

TABLE 2

| Time (min) | Viscosity (cP) |
|---|---|
| 0 | 25 |
| 0.25 | 24.5 |

TABLE 2-continued

| Time (min) | Viscosity (cP) |
|---|---|
| 1 | 26.5 |
| 2 | 28.5 |
| 5 | 29.5 |
| 10 | 29.5 |
| 15 | 29 |

This example demonstrates that the additives of the present disclosure may impart significant viscosity to a treatment fluid.

Example 3

Two fluid samples were each prepared as follows. Sample 6 (comparative) was prepared by mixing 1 gpt of a cationic polyacrylamide polymer and 1 gpt of an amphoteric surfactant with a brine produced from a Marcellus shale formation. Sample 7 was prepared by mixing 0.5 gpt of the amphoteric surfactant from Sample 6 and 1 gpt of the cationic multifunctional polyacrylamide from Samples 3 and 4 with a brine produced from a Marcellus shale formation along with 0.1% v/v of Cloisite® 20A clay nanoparticles. The viscosities of these fluid samples were measured ambient temperature using a Fann® 35 viscometer at a shear rate of 511 s$^{-1}$ at several intervals over a period of 15 minutes. Those measurements are reported in Table 3 below.

TABLE 3

| Time (min) | Viscosity (cP) | |
|---|---|---|
| | Sample 6 | Sample 7 |
| 0 | 15 | 13 |
| 0.25 | 14.5 | 12 |
| 1 | 14.5 | 12 |
| 2 | 15.5 | 12 |
| 5 | 17 | 11.5 |
| 10 | 16.5 | 11.5 |
| 15 | 16 | 11.5 |

This example demonstrates that the additives of the present disclosure may impart comparable or enhanced viscosity to treatment fluids as compared with certain other known friction reducing additives, even when a lower concentration of polymer is used.

An embodiment of the present disclosure is a method that includes: providing a treatment fluid that includes an aqueous base fluid and a friction reducing additive, the friction reducing additive including at least one polymer and a plurality of nanoparticles; and introducing the treatment fluid into a portion of a subterranean formation at or above a pressure sufficient to create or enhance at least one fracture in the subterranean formation.

In one or more embodiments described in the preceding paragraph, the polymer includes an anionic polymer. In one or more embodiments described above, the polymer includes a cationic polymer. In one or more embodiments described above, the polymer includes an amphoteric polymer. In one or more embodiments described above, the polymer includes a cationic acrylamide-based polymer. In one or more embodiments described above, the polymer includes at least one multifunctional polymer that includes one or more functional groups selected from the group consisting of: a choline group, a diallyldimethylammonium chloride group, and any combination thereof. In one or more embodiments described above, the polymer is present in the treatment fluid in an amount of less than about 2 gallons per thousand gallons of the treatment fluid. In one or more embodiments described above, the aqueous base fluid includes a brine. In one or more embodiments described above, the aqueous base fluid includes produced water. In one or more embodiments described above, the plurality of nanoparticles include at least one material selected from the group consisting of: silica, graphene, a metal, an alkaline earth metal, a metal oxide, boron, laponite, a hydroxide, a polymer, carbon, a clay, a composite material, and any combination thereof. In one or more embodiments described above, the plurality of nanoparticles includes a plurality of functionalized nanoparticles. In one or more embodiments described above, the treatment fluid further includes at least one surfactant. In one or more embodiments described above, the treatment fluid has a viscosity of from about 4 cP to about 50 cP.

Another embodiment of the present disclosure is a method that includes: providing a treatment fluid that includes an aqueous base fluid and a friction reducing additive, wherein the friction reducing additive includes at least one polymer, a surfactant, and a plurality of nanoparticles, and the treatment fluid has a viscosity of about 50 cP or less; and introducing the treatment fluid into a portion of a subterranean formation at or above a pressure sufficient to create or enhance at least one fracture in the subterranean formation.

In one or more embodiments described in the preceding paragraph, the polymer includes an anionic polymer. In one or more embodiments described above, the polymer includes a cationic polymer. In one or more embodiments described above, the polymer includes an amphoteric polymer. In one or more embodiments described above, the polymer includes a cationic acrylamide-based polymer. In one or more embodiments described above, the polymer includes at least one multifunctional polymer that includes one or more functional groups selected from the group consisting of: a choline group, a diallyldimethylammonium chloride group, and any combination thereof. In one or more embodiments described above, the polymer is present in the treatment fluid in an amount of less than about 2 gallons per thousand gallons of the treatment fluid. In one or more embodiments described above, the aqueous base fluid includes a brine. In one or more embodiments described above, the aqueous base fluid includes produced water. In one or more embodiments described above, the plurality of nanoparticles include at least one material selected from the group consisting of: silica, graphene, a metal, an alkaline earth metal, a metal oxide, boron, laponite, a hydroxide, a polymer, carbon, a clay, a composite material, and any combination thereof. In one or more embodiments described above, the plurality of nanoparticles includes a plurality of functionalized nanoparticles. In one or more embodiments described above, the plurality of nanoparticles includes clay nanoparticles.

Another embodiment of the present disclosure is a method including: providing a treatment fluid that includes an aqueous base fluid and a friction reducing additive, wherein the friction reducing additive includes at least one acrylamide-based polymer, wherein the acrylamide-based polymer is present in an amount of less than about 2 gallons per thousand gallons of the treatment fluid, a surfactant, and a plurality of clay nanoparticles; and introducing the treatment fluid into a portion of a subterranean formation at or above a pressure sufficient to create or enhance at least one fracture in the subterranean formation.

In one or more embodiments described in the preceding paragraph, the polymer includes an anionic polymer. In one or more embodiments described above, the polymer includes a cationic polymer. In one or more embodiments described above, the polymer includes an amphoteric polymer. In one or more embodiments described above, the polymer includes at least one multifunctional polymer that includes one or more functional groups selected from the group consisting of: a choline group, a diallyldimethylammonium chloride group, and any combination thereof. In one or more embodiments described above, the aqueous base fluid includes a brine. In one or more embodiments described above, the aqueous base fluid includes produced water. In one or more embodiments described above, the plurality of nanoparticles include at least one material selected from the group consisting of: silica, graphene, a metal, an alkaline earth metal, a metal oxide, boron, laponite, a hydroxide, a polymer, carbon, a clay, a composite material, and any combination thereof. In one or more embodiments described above, the plurality of nanoparticles includes a plurality of functionalized nanoparticles. In one or more embodiments described above, the treatment fluid further includes at least one surfactant. In one or more embodiments described above, the treatment fluid has a viscosity of from about 4 cP to about 50 cP.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   providing a treatment fluid that comprises an aqueous base fluid and a friction reducing additive, the friction reducing additive comprising at least one polymer and a plurality of nanoparticles,
   wherein the polymer comprises at least one multifunctional polymer that comprises one or more functional groups selected from the group consisting of: a choline group, a diallyldimethylammonium chloride group, and any combination thereof, and
   wherein the polymer is present in an amount in a range of from less than about 2 gallons per thousand gallons of the treatment fluid to greater than 0 gallons per thousand gallons of the treatment fluid and the plurality of nanoparticles are present in an amount of from about 0.01% to about 5% by volume of the treatment fluid; and
   introducing the treatment fluid into a portion of a subterranean formation at or above a pressure sufficient to create or enhance at least one fracture in the subterranean formation.

2. The method of claim 1 wherein the polymer comprises an anionic polymer.

3. The method of claim 1 wherein the polymer comprises a cationic polymer.

4. The method of claim 1 wherein the polymer comprises an amphoteric polymer.

5. The method of claim 1 wherein the polymer comprises a cationic acrylamide-based polymer.

6. The method of claim 1 wherein the polymer comprises at least one multifunctional polymer that comprises one or more choline groups.

7. The method of claim 1 wherein the aqueous base fluid comprises a brine.

8. The method of claim 1 wherein the aqueous base fluid comprises produced water.

9. The method of claim 1 wherein the plurality of nanoparticles comprise at least one material selected from the group consisting of: silica, graphene, a metal, an alkaline earth metal, a metal oxide, boron, laponite, a hydroxide, a polymer, carbon, a clay, a composite material, and any combination thereof.

10. The method of claim 1 wherein the plurality of nanoparticles comprises a plurality of functionalized nanoparticles.

11. The method of claim 1 wherein the treatment fluid further comprises at least one surfactant.

12. The method of claim 1 wherein the treatment fluid has an initial viscosity of from about 4 cP to about 50 cP.

13. A method comprising:
    providing a treatment fluid that comprises an aqueous base fluid and a friction reducing additive, wherein
    the friction reducing additive comprises at least one polymer, a surfactant, and a plurality of nanoparticles,
    the polymer comprises at least one multifunctional polymer that comprises one or more functional groups selected from the group consisting of: a choline group, a diallyldimethylammonium chloride group, and any combination thereof,
    the polymer is present in an amount in a range of less than about 2 gallons per thousand gallons of the treatment fluid to greater than 0 gallons per thousand gallons of the treatment fluid,
    the plurality of nanoparticles are present in an amount of from about 0.01% to about 5% by volume of the treatment fluid, and
    the treatment fluid has a viscosity of from about 4 cP to about 50 cP; and
    introducing the treatment fluid into a portion of a subterranean formation at or above a pressure sufficient to create or enhance at least one fracture in the subterranean formation.

14. The method of claim 13 wherein the plurality of nanoparticles comprises clay nanoparticles.

15. The method of claim 13 wherein the polymer comprises at least one multifunctional polymer that comprises one or more choline groups.

16. A method comprising:
    providing a treatment fluid that comprises an aqueous base fluid and a friction reducing additive, wherein the friction reducing additive comprises
    at least one acrylamide-based polymer, wherein the acrylamide-based polymer comprises at least one multifunctional polymer that comprises one or more functional groups selected from the group consisting of: a choline group, a diallyldimethylammonium chloride group, and any combination thereof and is present in an amount in a range of from less than about 2 gallons per thousand gallons of the treatment fluid to greater than 0 gallons per thousand gallons of the treatment fluid, a surfactant, and a plurality of clay nanoparticles, wherein the plurality of clay nanoparticles are present in an amount of from about 0.01% to about 5% by volume of the treatment fluid; and introducing the treatment fluid into a portion of a subterranean formation at or above a pressure sufficient to create or enhance at least one fracture in the subterranean formation.

17. The method of claim 16 wherein the acrylamide-based polymer comprises at least one multifunctional acrylamide-based polymer that comprises one or more a choline groups.

18. The method of claim 16 wherein the treatment fluid has an initial viscosity in a range of from about 4 cP to about 50 cP.

* * * * *